United States Patent
Selvaraju et al.

(10) Patent No.: US 8,233,293 B2
(45) Date of Patent: Jul. 31, 2012

(54) REVERSE CURRENT PROTECTION FOR POWER CONVERTERS HAVING SYNCHRONOUS RECTIFIERS

(75) Inventors: Palanivel Selvaraju, Pasig (PH); Ronnie A. Bagalay, Pasig (PH)

(73) Assignee: Astec International Limited, Kwun Tong, Kowloon (HK)

( * ) Notice: Subject to any disclaimer, the term of this patent is extended or adjusted under 35 U.S.C. 154(b) by 853 days.

(21) Appl. No.: 11/654,707

(22) Filed: Jan. 18, 2007

(65) Prior Publication Data

US 2007/0165429 A1    Jul. 19, 2007

Related U.S. Application Data

(60) Provisional application No. 60/760,322, filed on Jan. 19, 2006.

(51) Int. Cl.
*H02M 3/24* (2006.01)
*H02H 7/125* (2006.01)

(52) U.S. Cl. ............. 363/21.14; 323/272; 323/287; 363/56.1

(58) Field of Classification Search ............ 323/272, 323/286, 287; 363/21.06, 21.14, 56.01–56.03, 363/71, 21.12, 56.1
See application file for complete search history.

(56) References Cited

U.S. PATENT DOCUMENTS

| | | | | |
|---|---|---|---|---|
| 5,956,245 | A * | 9/1999 | Rozman | 363/89 |
| 6,101,104 | A * | 8/2000 | Eng | 363/21.06 |
| 6,191,964 | B1 * | 2/2001 | Boylan et al. | 363/89 |
| 6,301,133 | B1 | 10/2001 | Cuadra et al. | |
| 6,373,732 | B1 | 4/2002 | Patel et al. | |
| 6,426,884 | B1 | 7/2002 | Sun | |
| 6,462,965 | B1 * | 10/2002 | Uesono | 363/21.14 |
| 6,594,163 | B2 * | 7/2003 | Tsai | 363/50 |
| 6,778,412 | B2 * | 8/2004 | Nagai et al. | 363/21.06 |
| 6,961,253 | B1 * | 11/2005 | Cohen | 363/89 |
| 7,012,821 | B1 * | 3/2006 | Park et al. | 363/21.12 |
| 7,035,120 | B2 * | 4/2006 | Tobita | 363/21.06 |
| 2002/0089862 | A1 * | 7/2002 | Amei | 363/21.07 |
| 2005/0270001 | A1 * | 12/2005 | Jitaru | 323/247 |

FOREIGN PATENT DOCUMENTS

JP    0634262    12/1994

* cited by examiner

*Primary Examiner* — Adolf Berhane
*Assistant Examiner* — Fred E Finch, III
(74) *Attorney, Agent, or Firm* — Harness, Dickey & Pierce, P.L.C.

(57) ABSTRACT

A power supply includes an input, an output, a reverse current protection circuit, a synchronous rectifier and an output choke. The reverse current protection circuit is configured for detecting a flyback voltage indicative of reverse current, and for deactivating the synchronous rectifier in response to detecting the flyback voltage. The flyback voltage can be detected a variety of ways, including across the output choke, across a switch in the synchronous rectifier, across the secondary winding of a power transformer, etc.

23 Claims, 13 Drawing Sheets

REVERSE CURRENT PROTECTION FOR POWER CONVERTERS HAVING SYNCHRONOUS RECTIFIERS

CROSS-REFERENCE TO RELATED APPLICATION

This application claims the benefit of U.S. Provisional Application No. 60/760,322 filed Jan. 19, 2006.

FIELD

The present disclosure relates to reverse current protection for power converters employing synchronous rectifiers.

BACKGROUND

The statements in this section merely provide background information related to the present disclosure and may not constitute prior art.

The present trend in power converter technology calls for increased power density with little or no compromise in efficiency. Accordingly, circuit elements such as synchronous rectifiers and ORing MOSFETs, due to their efficiency, are important to power converter design.

However, these circuit elements can be damaged when they are employed in power converters that are susceptible to reverse current. For example, a bus converter typically includes two or more power converters (also referred to as power supply modules) coupled to an output via a bus. Reverse current can flow in one or more of the power converters if, for example, the output voltage of one power converter is greater than the output voltage of another power converter. Further, reverse current can flow in a power converter having an output connected to a voltage source, such as a battery or a capacitor bank. Also, reverse current can flow in a power converter that is operating at no load or minimum load (e.g., less than 10% of rated load). In addition to possibly damaging circuit elements, reverse current generally degrades power converter performance.

In order to protect circuit elements such as synchronous rectifiers and ORing MOSFETs from reverse current, some power converters employ a comparator to compare a current sensor output with a reference to determine whether a particular synchronous rectifier should be deactivated. The current sensor can be a resistor, current transformer or Hall Effect sensor. These sensors, however, can decrease the efficiency of the power converter.

SUMMARY

According to one example of the present disclosure, a power supply includes a plurality of interconnected power supply modules for supplying power to an output load. At least one of the power supply modules includes a synchronous rectifier, an output choke, and a reverse current protection circuit. The reverse current protection circuit is configured for detecting a flyback voltage across the output choke, and for deactivating the synchronous rectifier in response to detecting the flyback voltage. The flyback voltage is indicative of reverse current in the power supply module.

According to another example of the present disclosure, a power supply includes a plurality of interconnected power supply modules for supplying power to an output load. At least one of the power supply modules includes a synchronous rectifier, an output choke, and a reverse current protection circuit. The reverse current protection circuit is configured for detecting a flyback voltage indicative of reverse current in the power supply module, and for deactivating the synchronous rectifier in response to detecting the flyback voltage.

According to yet another example of the present disclosure, a power supply includes at least one power supply module having a synchronous rectifier, an output choke, and a reverse current protection circuit. The reverse current protection circuit is configured for detecting a flyback voltage indicative of reverse current in the power supply module, and for deactivating the synchronous rectifier in response to detecting the flyback voltage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Illustrative embodiments of the present disclosure are described below. In the interest of clarity, not all features of an actual implementation are described in this specification. It will be appreciated that in the development of any embodiment, numerous implementation-specific decisions must be made to achieve specific goals, such as performance objectives and compliance with system-related, business-related and/or environmental constraints. Moreover, it will be appreciated that such development efforts may be complex and time-consuming, but would nevertheless be a routine undertaking for those of ordinary skill in the art having the benefit of this disclosure.

Figure 1:
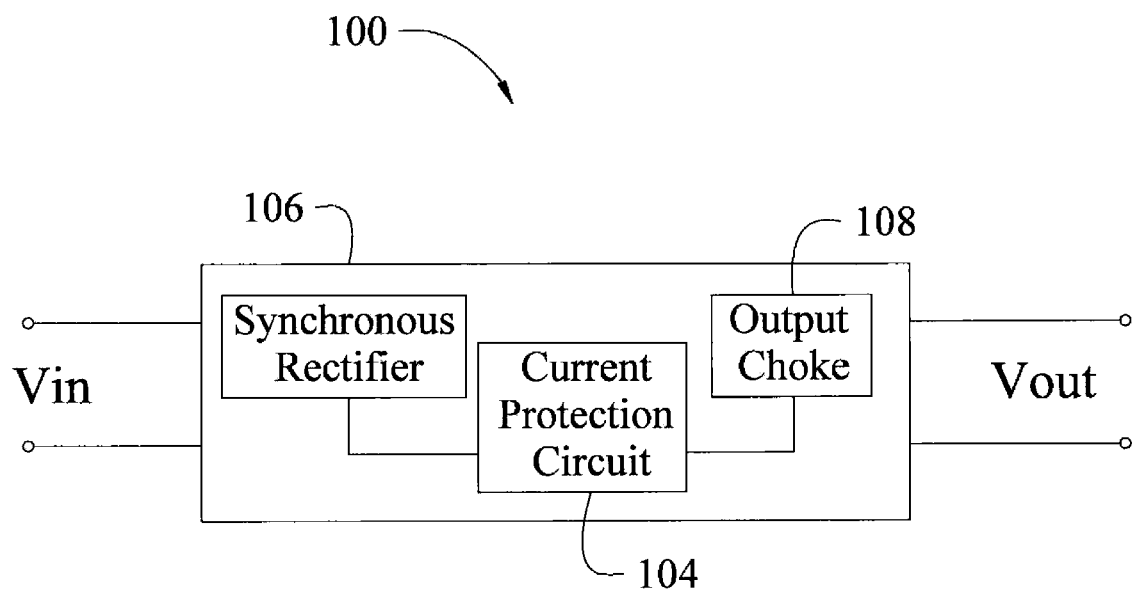
FIG. 1 is a block diagram of a power converter according to one embodiment of the present disclosure.

A power converter according to one aspect of the present disclosure is illustrated in FIG. 1 and indicated generally by reference numeral 100. The power converter 100 includes an input $V_{in}$, an output $V_{out}$, a reverse current protection circuit 104, a synchronous rectifier 106 and an output choke 108. The reverse current protection circuit 104 is coupled to the synchronous rectifier 106 and the output choke 108. The reverse current protection circuit 104 is configured to deactivate (i.e., turn off) the synchronous rectifier 106 in response to detecting reverse current in the output choke 108.

Detecting reverse current using voltage from an output choke is in contrast to known designs which use inefficient elements, such as a sense resistor or a current transformer to detect reverse current. Furthermore, the reverse current protection circuit 104 can achieve faster deactivation of synchronous rectifiers than other known designs since output chokes can directly reflect a reverse current.

Figure 2:
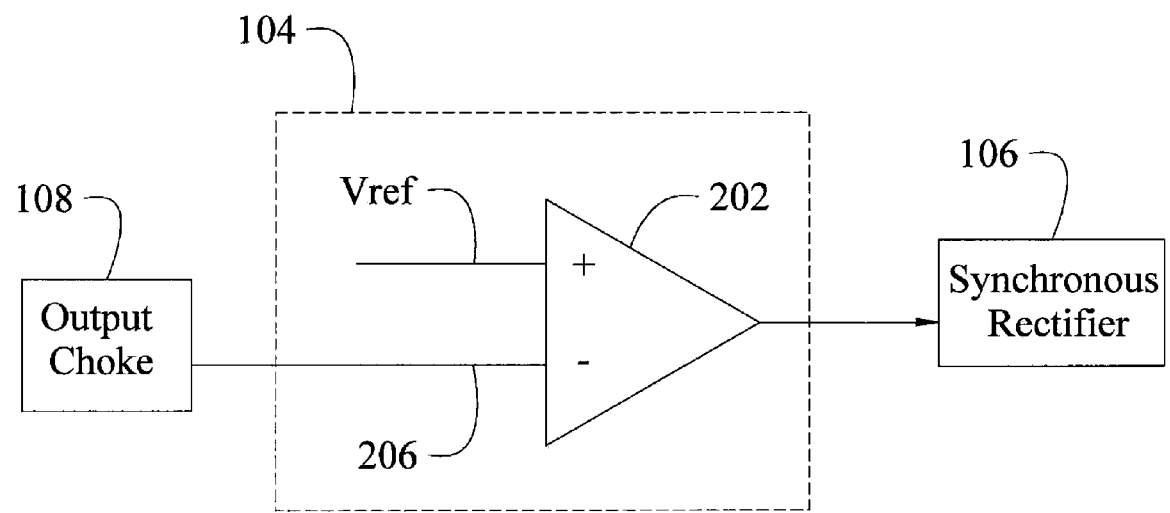
FIG. 2 is a block diagram of the reverse current protection circuit shown in FIG. 1 according to another embodiment of the present disclosure.

In some embodiments, as illustrated in FIG. 2, the reverse current protection circuit 104 can include a comparator 202 that compares a reference voltage $V_{ref}$ with a voltage 206 from the output choke 108. As shown in FIG. 2, the reference voltage $V_{ref}$ is coupled to the positive terminal of the comparator 202 and the output choke voltage 206 is coupled to the negative terminal of the comparator 202. The comparator 202 is configured to deactivate the synchronous rectifier 106 when the output choke voltage 206 is greater than the reference voltage $V_{ref}$.

The output choke voltage 206 will typically be greater than the reference voltage $V_{ref}$ when the output choke 108 is operating in a discontinuous mode (i.e., when the output choke's peak ripple current is greater than the current at the output $V_{out}$).

Figure 3:
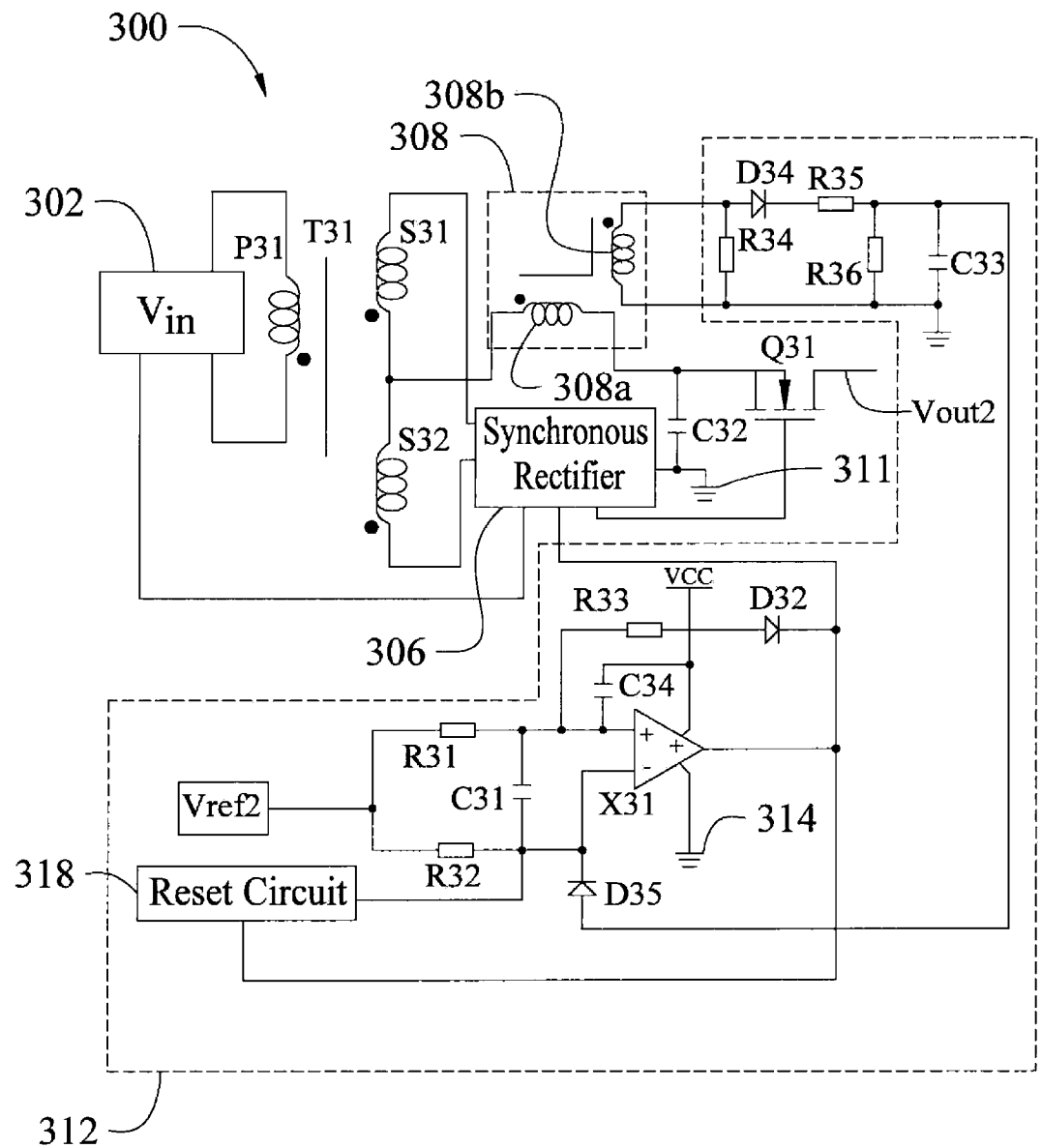
FIG. 3 is a circuit diagram of a power converter having a reverse current protection circuit according to another embodiment of the present disclosure.

A power converter 300 according to another embodiment of the present disclosure is illustrated in FIG. 3. The power converter 300 includes an input voltage 302 (e.g., from a DC-DC bridge), a reverse current protection circuit 312, a synchronous rectifier 306 including one or more switches (not shown) and an output choke 308. The output choke 308 includes a main winding 308a and an auxiliary winding 308b. Additionally, the power converter 300 includes a transformer T31 having a primary winding P31 and secondary windings S31 and S32, an ORing MOSFET Q31, a capacitor C32 and an output $V_{out2}$.

The reverse current protection circuit 312 includes a comparator X31 coupled to a voltage supply VCC. The comparator X31 compares a reference voltage $V_{ref2}$ with a voltage from the auxiliary winding 308b. The reference voltage $V_{ref2}$ is coupled to the positive terminal of the comparator X31 and the voltage from the auxiliary winding 308b is coupled to the negative terminal of the comparator X31. Additionally, the reverse current protection circuit 312 includes a reset circuit 318, resistors R31-R36, capacitors C31, C33-C34 and diodes D32, D34-D35.

During normal operation of the power converter 300, the voltage at the positive terminal of the comparator X31 will be higher than the voltage at the negative terminal of the comparator X31 such that the output of the comparator X31 is high. However, when reverse current attempts to flow through the power converter 300, flyback voltage stored in the output choke 308a will be reflected through the auxiliary winding 308b causing the voltage at the negative terminal of the comparator X31 to be greater than the reference voltage $V_{ref2}$ (which can be, among other suitable voltages, 2.5 V). As a result, the output of the comparator X31 is switched to low, causing the synchronous rectifier 306 to be deactivated. The resistor R33 and the diode D32 are latch elements that will keep the synchronous rectifier 306 deactivated. The reset circuit 318 resets the comparator X31 to high to thereby activate (i.e., turn on) the synchronous rectifier 306 when reverse current no longer attempts to flow through the power converter 300.

Figure 4A:
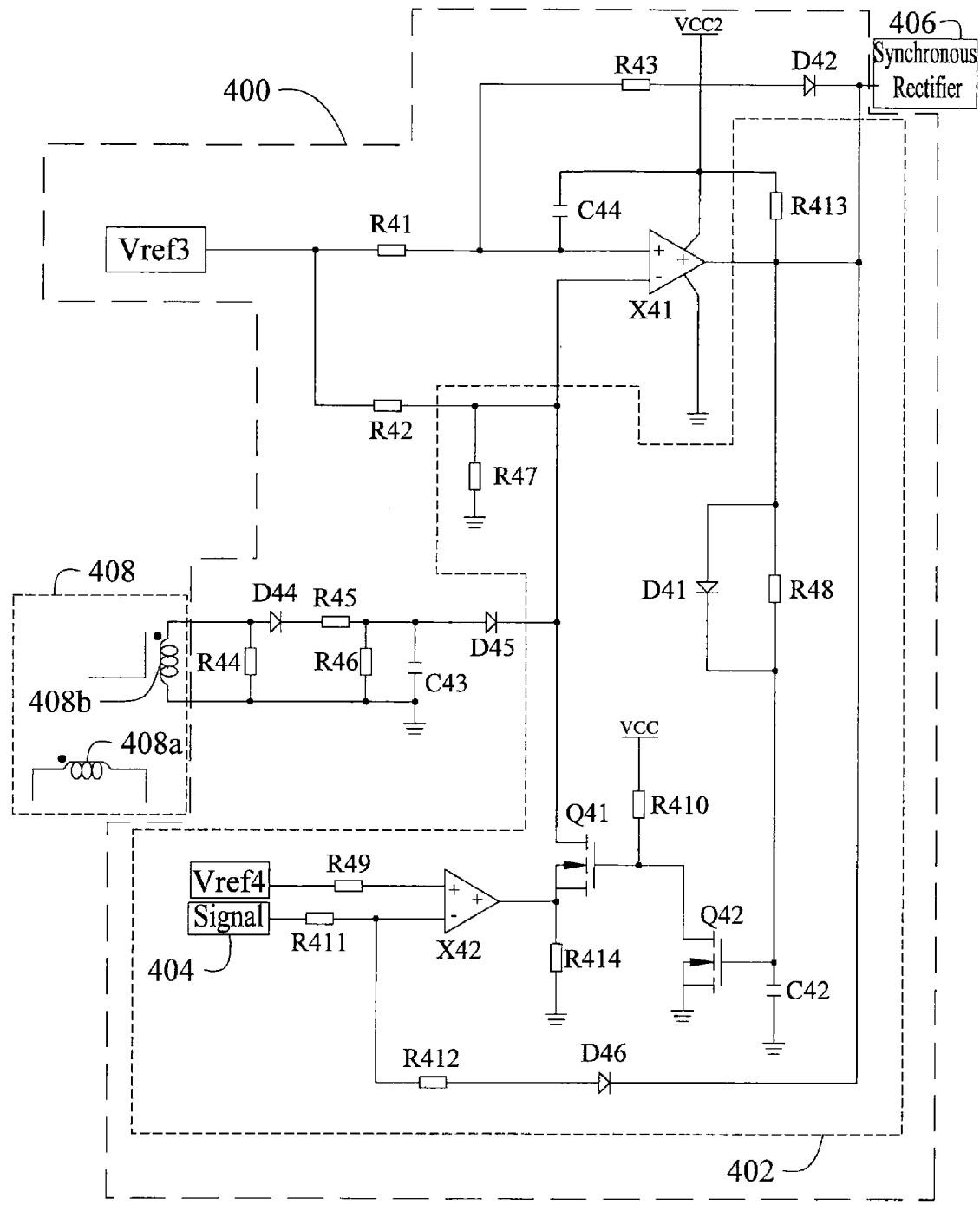
FIG. 4A is a circuit diagram of a reverse current protection circuit according to another embodiment of the present disclosure.

A reverse current protection circuit 400 according to another embodiment of the present disclosure is illustrated in FIG. 4A. The reverse current protection circuit 400 can be employed in a power converter (such as the power converter 300) having a synchronous rectifier 406 and an output choke 408 including a main winding 408a and an auxiliary winding 408b. Similar to the reverse current protection circuit 312, the reverse current protection circuit 400 includes a comparator X41 coupled a voltage supply VCC2. The comparator X41 compares a reference voltage $V_{ref3}$ with a voltage from the auxiliary winding 408b. The reference voltage $V_{ref3}$ is coupled to the positive terminal of the comparator X41 and the voltage from the auxiliary winding 408b is coupled to the negative terminal of the comparator X31. Additionally, the reverse current protection circuit 400 includes resistors R41-R46, capacitors C43-C44 and diodes D42, D44-D45.

In the particular embodiment of FIG. 4A, the reverse current protection circuit 400 includes a reset circuit 402. The reset circuit 402 receives a signal 404 from a current transformer (not shown) that monitors load current in the power supply module. The signal 404 is coupled to the negative terminal of the comparator X42. A reference voltage $V_{ref4}$ is coupled to the positive terminal of the comparator X42 via a resistor R49. Additionally, the reset circuit 402 includes resistors R48, R410-R414, diodes D41 and D46 and a capacitor C42.

When reverse current attempts to flow through the output choke 408, flyback voltage stored in the output choke 408a will be reflected through the auxiliary winding 408b causing the voltage at the negative terminal of the comparator X41 to be greater than the reference voltage $V_{ref3}$. As a result, the output of the comparator X41 is switched low, causing the synchronous rectifier 406 to be deactivated. The resistor R43 and the diode D42 are latch elements for holding the synchronous rectifier 306 in the deactivated state.

The reset circuit 402 resets the comparator X41 to high, thereby activating the synchronous rectifier 406, when reverse current no longer attempts to flow through the power converter. More specifically, when R43 and D42 are pulled down to keep the synchronous rectifier 406 deactivated, a timer defined by the time constant (resistor R48)*(capacitor C42) will cause the switch Q42 to turn off, which will subsequently turn on the switch Q41. When the switch Q41 is turned on, the output of the comparator X42 can reset the comparator X41. The comparator X41 resets if the voltage at the negative terminal of the comparator X42 is greater than the voltage at the positive terminal of the comparator X42. Resetting the comparator X41 typically occurs when a load current is greater than 10% of rated load for the power supply module.

Figure 4B:
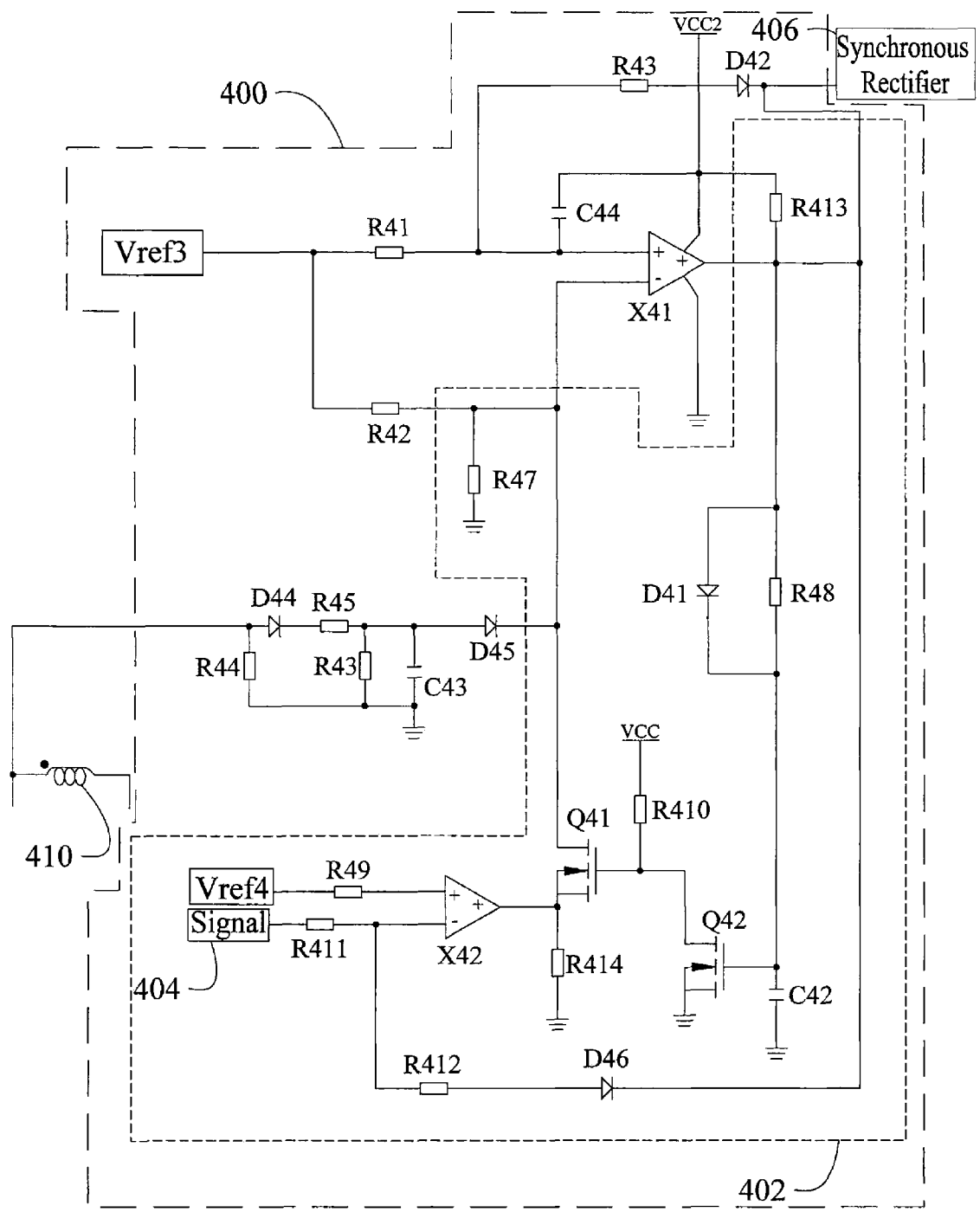
FIG. 4B is a circuit diagram of an alternative reverse current protection circuit.

FIG. 4B illustrates the reverse current protection circuit 400 of FIG. 4A, but with an output choke 410 instead of the output choke 408. The output choke 410 does not include an auxiliary winding and can be employed in power converters that do not require isolation.

Figure 5A:
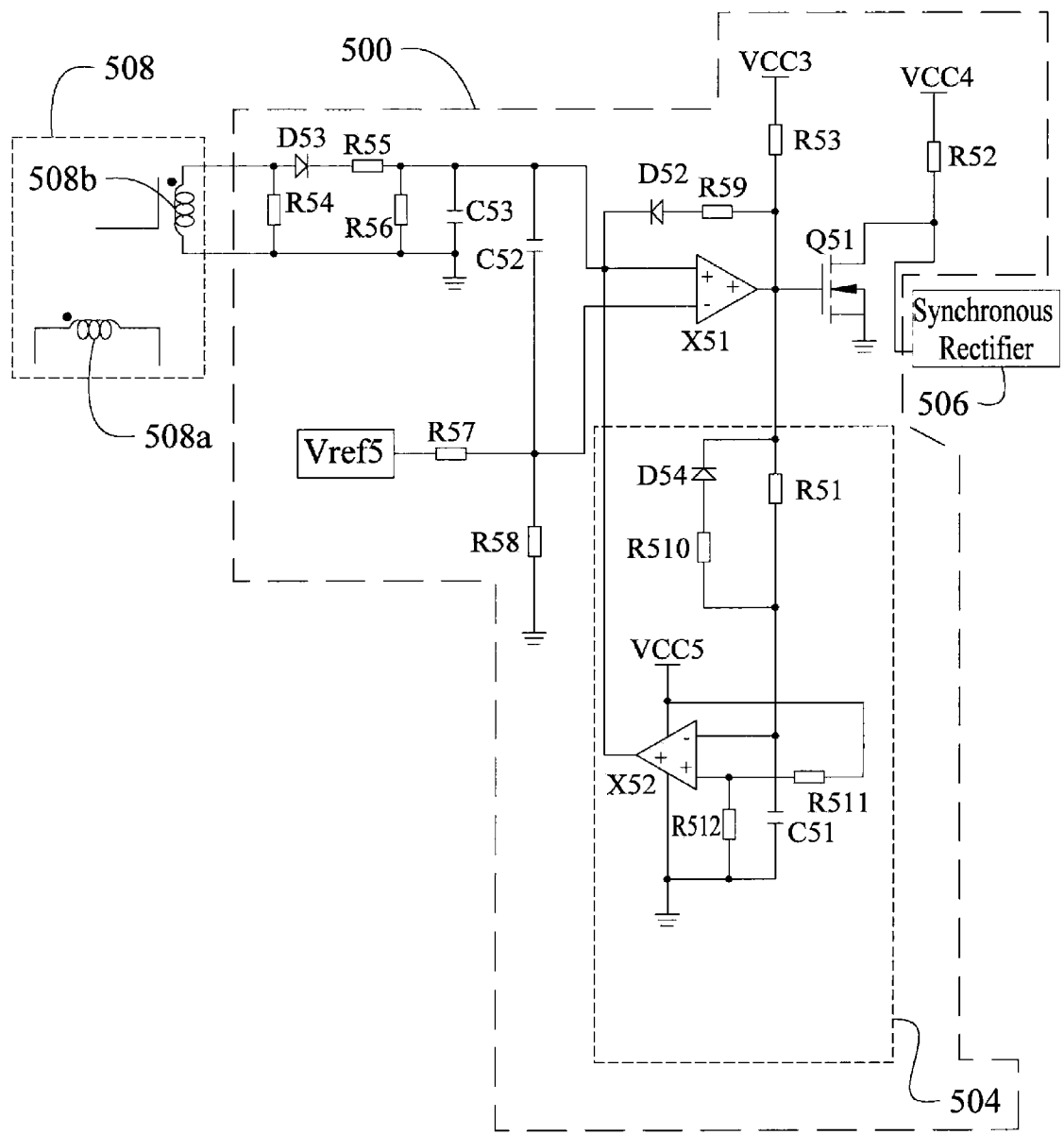
FIG. 5A is a circuit diagram of a reverse current protection circuit according to still another embodiment of the present disclosure.

A reverse current protection circuit 500 according to another embodiment of the present disclosure is illustrated in FIG. 5A. The reverse current protection circuit 500 can be employed in a power converter (such as the power converter 300) having a synchronous rectifier 506 and an output choke 508. The output choke 508 includes a main winding 508a and an auxiliary winding 508b.

As shown in FIG. 5A, the reverse current protection circuit 500 includes a comparator X51 coupled to a voltage supply VCC3. The comparator X51 compares a reference voltage $V_{ref5}$ with a voltage from the auxiliary winding 508b. The reference voltage $V_{ref5}$ is coupled to the negative terminal of the comparator X51 and the voltage from the auxiliary winding 508b is coupled to the positive terminal of the comparator X51. Additionally, the reverse current protection circuit includes resistors R52-R59, capacitors C52-C53, diodes D52-D53, and voltages supplies VCC3-VCC4.

When reverse current attempts to flow through the output choke 508, flyback voltage from the output choke 508a will be reflected through the auxiliary winding 508b causing the voltage at the positive terminal of the comparator X51 to be greater than the voltage at the negative terminal of the comparator X51. As a result, a switch Q51 will turn on, which will deactivate the synchronous rectifier 506. The diode D52 and the resistor R59 will hold the synchronous rectifier in the deactivated state.

The reverse current protection circuit 500 further includes a reset circuit 504. The reset circuit is configured to reset the comparator X51 to low, thereby activating the synchronous rectifier 506, when reverse current no longer attempts to flow through the power converter. The reset circuit 504 includes a comparator X52, a voltage supply VCC5, resistors R51, R510-R512, a capacitor C51 and a diode D54. A delay defined by the time constant (resistor R51)*(capacitor C51) will be activated to reset the comparator X51. The comparator X51 will reset after the delay.

Figure 5B:
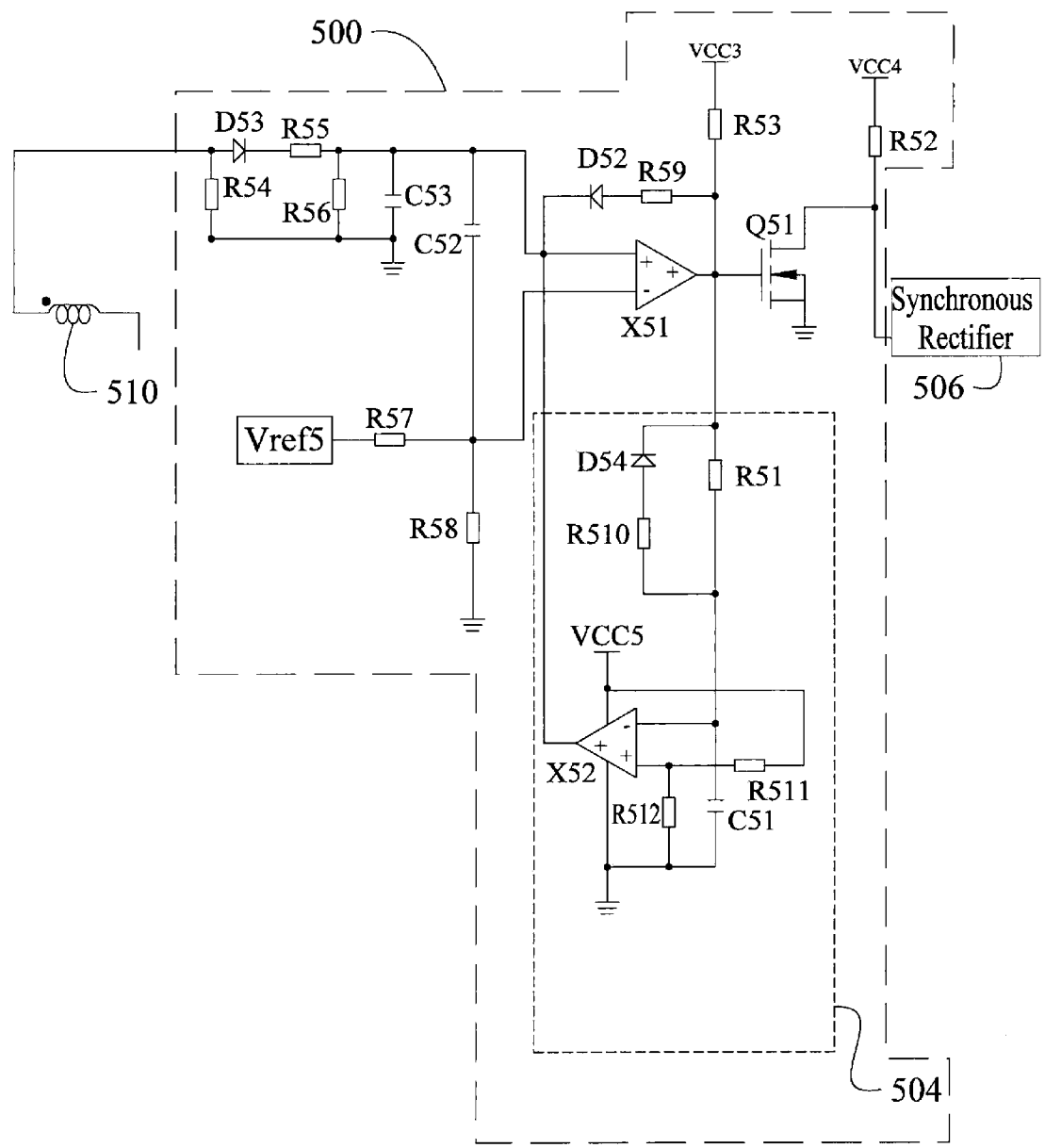
FIG. 5B is a circuit diagram of the reverse current protection circuit of FIG. 5A having an alternative output choke.

FIG. 5B illustrates the reverse current protection circuit 400 of FIG. 5A, but with an output choke 510 instead of the output choke 508. The output choke 510 does not include an auxiliary winding and can be employed in power converters that do not require isolation.

Figure 6A:
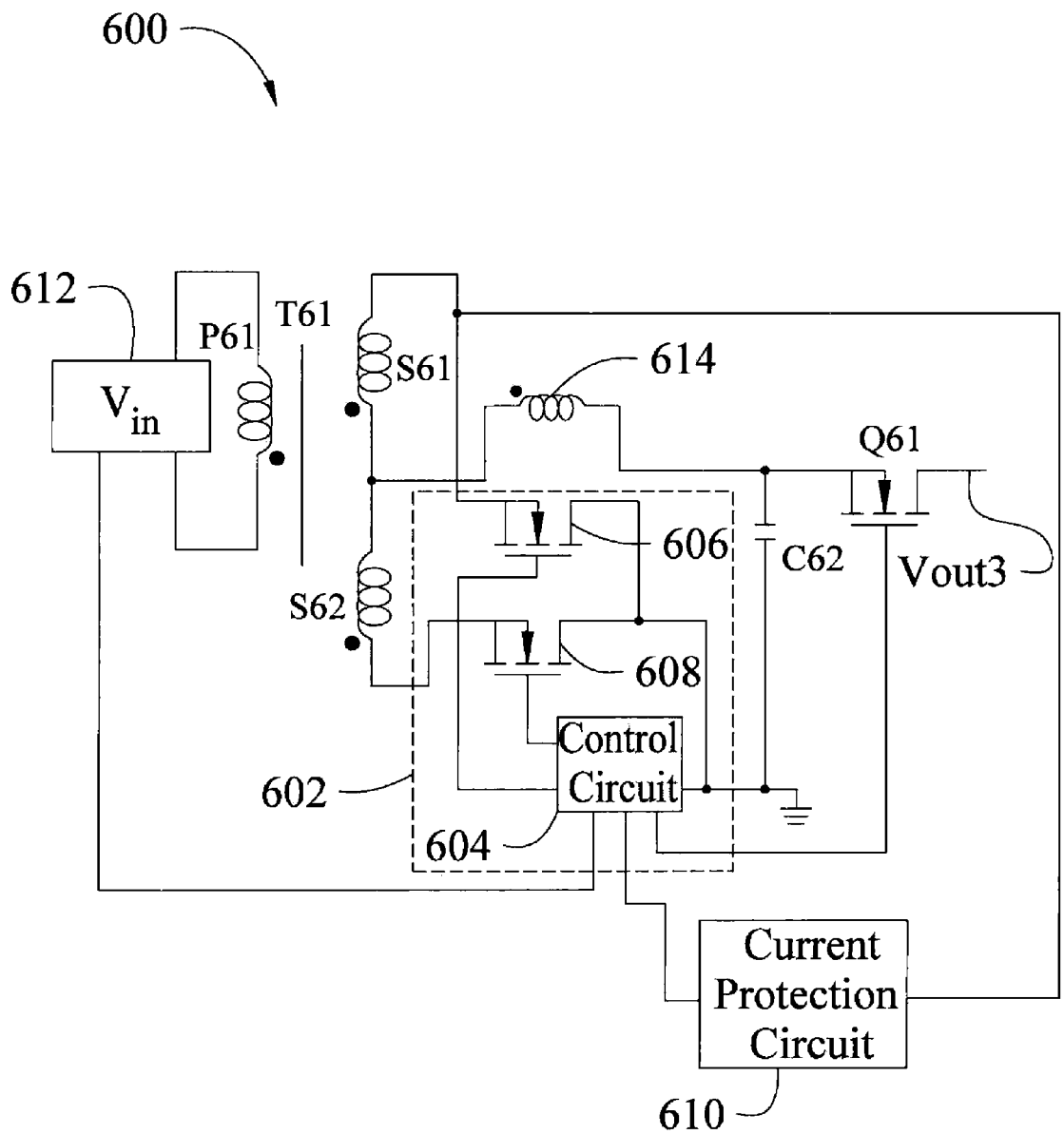
FIG. 6A is a circuit diagram of a power converter according to another embodiment of the present disclosure.

FIG. 6A illustrates a power converter 600 according to another embodiment. The power converter 600 includes a synchronous rectifier 602 and a reverse current protection circuit 610. The synchronous rectifier 602 includes a control circuit 604 and switches 606 and 608. The reverse current protection circuit 610, in response to voltage from the switch 606, is configured to deactivate the synchronous rectifier 602.

Additionally, the power converter 600 includes a transformer T61 having a primary winding P61 and secondary windings S61 and S62, an input voltage 612, an output choke 614, an ORing MOSFET Q61, a capacitor C62 and an output $V_{out3}$.

Figure 6B:
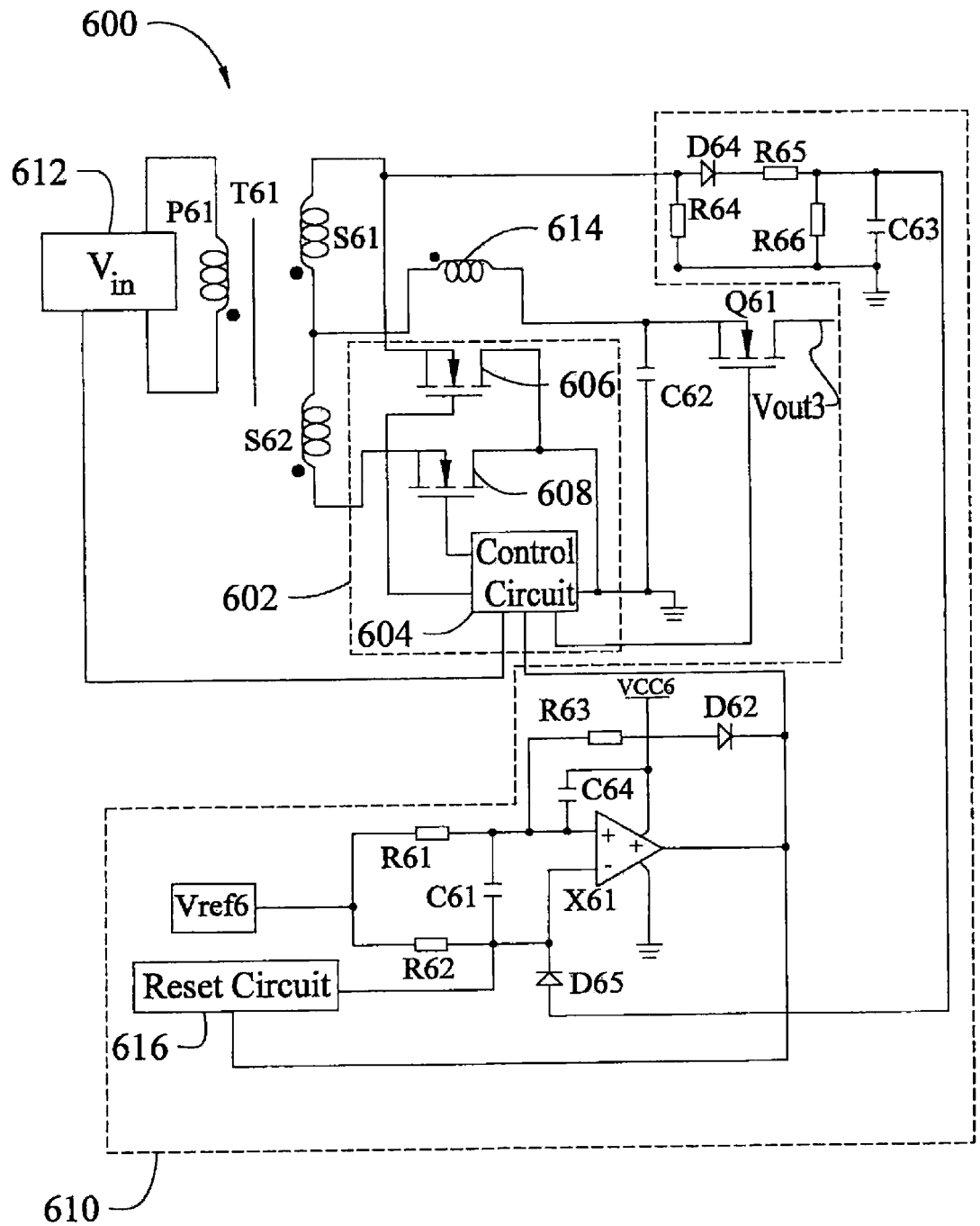
FIG. 6B is a circuit diagram of a power converter according to yet another embodiment of the present disclosure.

In some embodiments, as illustrated in FIG. 6B, the reverse current protection circuit 610 includes a comparator X61 coupled a voltage supply VCC6. The comparator X61 compares a reference voltage $V_{ref6}$ with a voltage from the switch 606. The reference voltage $V_{ref6}$ is coupled to the positive terminal of the comparator X61 and the voltage from the switch 606 is coupled to the negative terminal of the comparator X61. Additionally, the reverse current protection circuit 610 includes a reset circuit 616, resistors R61-R66, capacitors C61, C63-C64 and diodes D62, D64-D65.

Similar to some of the reverse current circuits described above, during normal operation of the power converter 600, the voltage at the positive terminal of the comparator X61 will be higher than the voltage at the negative terminal of the comparator X61 such that the output of the comparator X61 is high. However, when reverse current attempts to flow through the power converter 600, the voltage at the negative terminal of the comparator X61 (i.e., voltage from the switch 606) will be greater than the reference voltage $V_{ref6}$. As a result, the output of the comparator X61 is switched low, causing the controls 604 to deactivate one or more of the switches 606 and 608.

Also, similar to some of the reset circuits described above, the reset circuit 616 resets the comparator X61 to high when reverse current no longer attempts to flow through the power converter 600. The reset circuit 616 can be any of the reset circuits described above, or other suitable reset circuits including a timer such as a 555 timer or a microcontroller.

The switch 606 can be a MOSFET and the voltage from the switch can be the drain-to-source voltage. It should be understood, however, that other suitable switches may be used without departing from the scope of this disclosure.

Figure 7A:
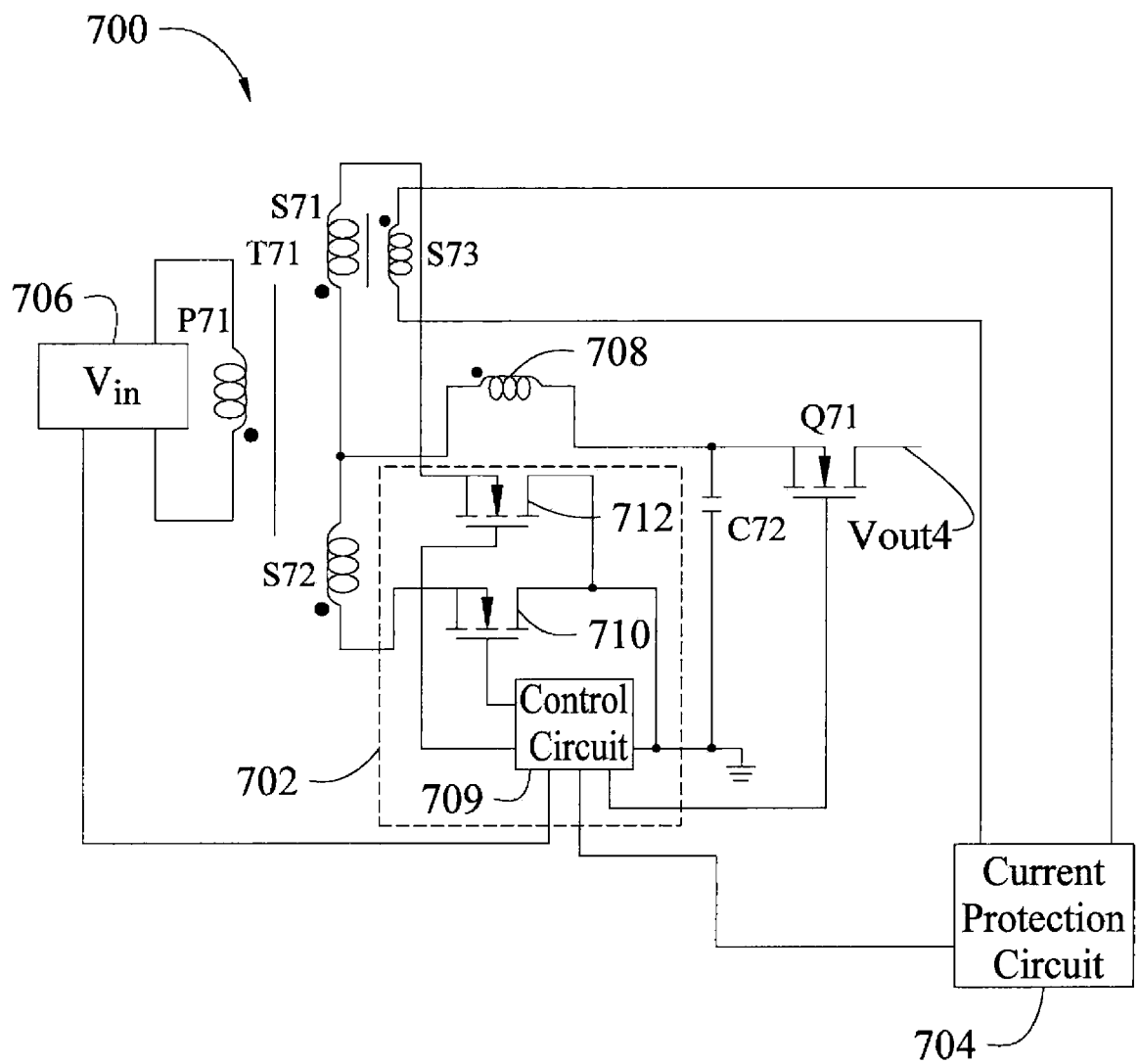
FIG. 7A is a circuit diagram of a power converter according to still another embodiment of the present disclosure.

FIG. 7A illustrates a power converter 700 according to another embodiment. The power converter 700 includes a synchronous rectifier 702 and a reverse current protection circuit 704. The synchronous rectifier 702 includes a control circuit 709 and switches 710 and 712. The power converter 700 further includes a transformer T71 having a primary winding P71 and secondary windings S71, S72 and S73. The reverse current protection circuit 704, in response to detecting a flyback voltage across the secondary winding S73, is configured to deactivate the synchronous rectifier 702.

Additionally, the power converter 700 includes an input voltage 706, an output choke 708, an ORing MOSFET Q71, a capacitor C72 and an output $V_{out4}$.

Figure 7B:
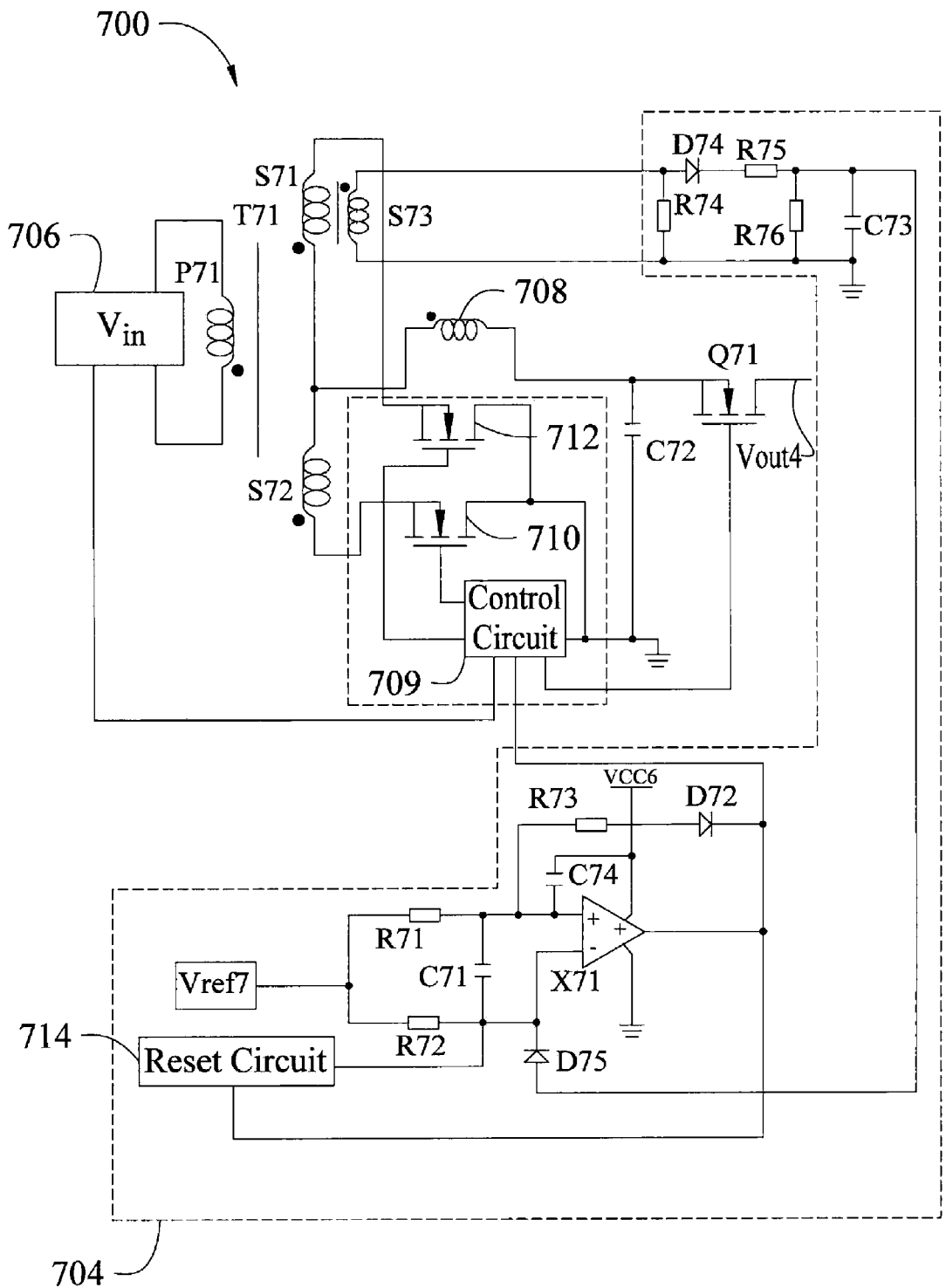
FIG. 7B is a circuit diagram of a power converter according to another embodiment of the present disclosure.

In some embodiments, as illustrated in FIG. 7B, the reverse current protection circuit 704 includes a comparator X71 coupled to a voltage supply VCC7. The comparator X71 compares a reference voltage $V_{ref7}$ with a voltage from the secondary winding S73. The reference voltage $V_{ref7}$ is coupled to the positive terminal of the comparator X71 and the voltage from the secondary winding S73 is coupled to the negative terminal of the comparator X71.

Additionally, the reverse current protection circuit 704 includes a reset circuit 714, resistors R71-R76, capacitors C71, C73-C74 and diodes D72, D74-D75.

Similar to some of the reverse current circuits described above, during normal operation of the power converter 700, the positive terminal of the comparator X71 will be higher than the negative terminal of the comparator X71 such that the output of the comparator X71 is high. However, when reverse current attempts to flow through the power converter 700, the voltage at the negative terminal of the comparator X71 will be greater than the reference voltage $V_{ref7}$. As a result, the output of the comparator X71 is switched low, causing the controls 704 to deactivate one or more of the switches 710 and 712.

Also, similar to some of the reset circuits described above, the reset circuit 714 resets the comparator X71 to high when reverse current no longer attempts to flow through the power converter 700. The reset circuit 714 can be any of the reset circuits described above, or other suitable reset circuits including a conventional timer such as a 555 timer or a microcontroller.

Figure 8A:
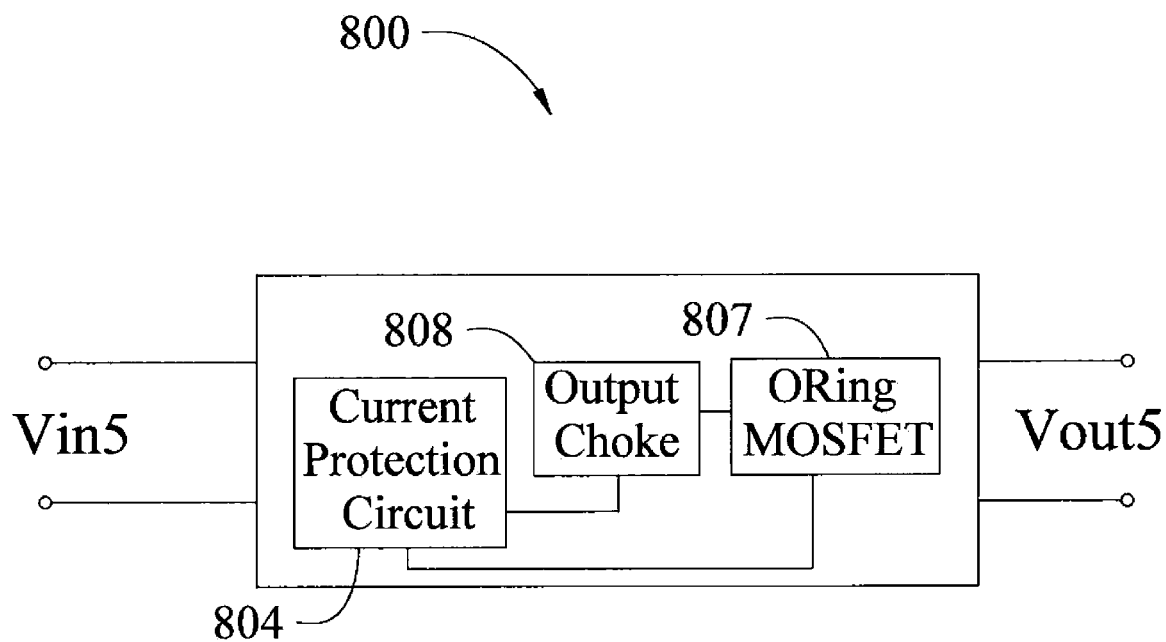
FIG. 8A is a block diagram of a power converter according to yet another embodiment of the present disclosure.

A power converter 800 according to yet another embodiment of the present disclosure is illustrated in FIG. 8A. The power converter 800 includes an input $V_{in5}$, an output $V_{out5}$, a reverse current protection circuit 804, an ORing MOSFET 807 and an output choke 808. The reverse current protection circuit 804 is coupled to the ORing MOSFET 807 and the output choke 808. The ORing MOSFET 807 is also coupled to the output choke 808. The reverse current protection circuit 804, in response to detecting a flyback voltage across the output choke 808, is configured to deactivate the ORing MOSFET 807 to prevent reverse current from flowing through the power converter 800.

Figure 8B:
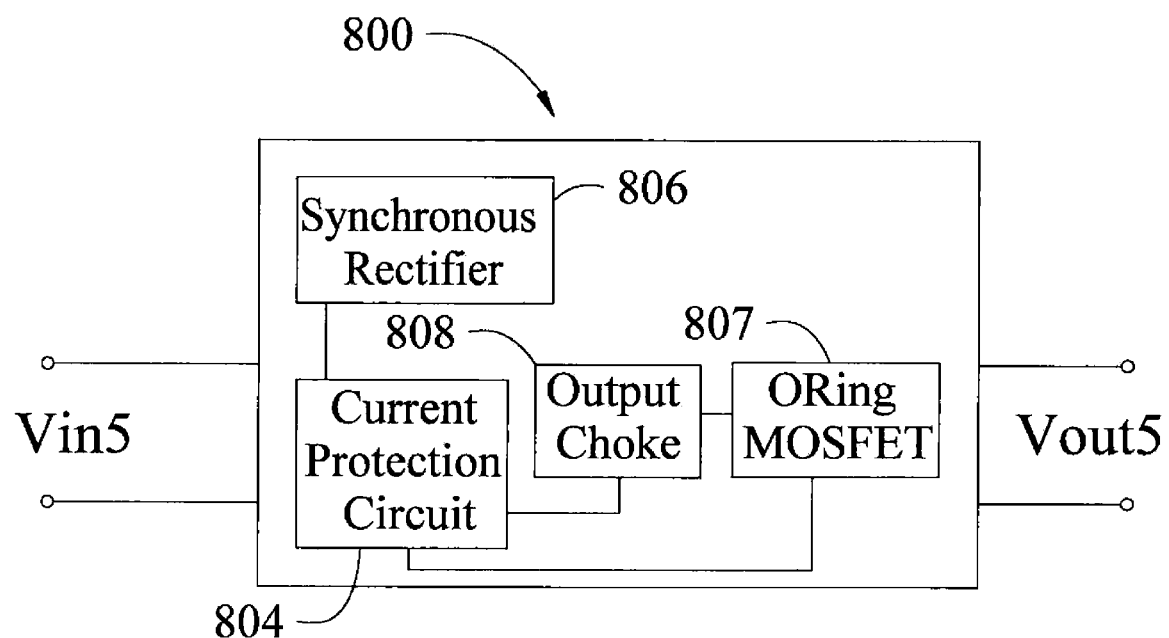
FIG. 8B is a block diagram of a power converter according to another embodiment of the present disclosure.

In some embodiments, as illustrated by a power converter 802 shown in FIG. 8B, the reverse current protection circuit 804 can be coupled to a synchronous rectifier 806. Further, the reverse current protection circuit 804 can be configured to deactivate the synchronous rectifier 806 to prevent reverse current from flowing through the power converter 802.

It should noted that the power converters 300, 600, 700, 800 and 802 can be employed in a bus converter, in which two or more power converters are coupled to an output via a bus, without departing from the scope of this disclosure.

In addition, the reverse current protection circuits described above can be employed in suitable power converters having synchronous rectifiers and/or ORing MOSFETs.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A power supply comprising:
   a plurality of interconnected power supply modules for supplying power to an output load,
   at least one of the power supply modules including a synchronous rectifier, an output choke, and a reverse current protection circuit,
   the reverse current protection circuit configured for detecting a flyback voltage across the output choke, the flyback voltage being indicative of reverse current in the power supply module, and for deactivating the synchronous rectifier in response to detecting the flyback voltage.

2. The power supply of claim 1 wherein the at least one power supply module further includes an ORing MOSFET.

3. The power supply of claim 1 wherein the reverse current protection circuit includes at least a first comparator for comparing a voltage across the output choke with a reference voltage to detect the flyback voltage.

4. The power supply of claim 3 wherein the reverse current protection circuit is configured for deactivating the synchronous rectifier when the voltage across the output choke is greater than the reference voltage.

5. The power supply of claim 4 wherein the reverse current protection circuit includes a reset circuit for activating the synchronous rectifier in response to detecting a turn-on condition.

6. The power supply of claim 5 wherein the reset circuit includes a timer defined by a time constant for delaying the reset circuit from activating the synchronous rectifier in response to detecting the turn-on condition.

7. The power supply of claim 3 wherein the power supply module includes a current transformer and the reverse current protection circuit includes a second comparator for comparing a voltage from the current transformer with a reference voltage to determine whether a turn-on condition exists.

8. The power supply of claim 7 wherein the reverse current protection circuit is configured to activate the synchronous rectifier when the load current in the power supply module is greater than ten percent (10%) of a full rated load current.

9. The power supply of claim 8 wherein the plurality of power supply modules are connected in a parallel configuration and each power supply module includes a synchronous rectifier, an output choke, and a reverse current protection circuit.

10. The power supply of claim 1 wherein the plurality of power supply modules each include a reverse current protection circuit.

11. The power supply of claim 10 wherein the plurality of power supply modules are connected in a parallel configuration.

12. The power supply of claim 1 wherein the output choke includes a main winding and an auxiliary winding, and wherein the reverse current protection circuit is configured for detecting the flyback voltage across the main winding as reflected through the auxiliary winding.

13. The power supply of claim 1 wherein the at least one power supply module further includes a transformer having a secondary winding, and wherein the output choke is coupled to the secondary winding of the transformer.

14. A power supply comprising:
   at least one power supply module including a synchronous rectifier, an output choke, and a reverse current protection circuit, the synchronous rectifier including one or more switches and a control circuit for the one or more switches,
   the reverse current protection circuit configured for detecting a flyback voltage across the output choke, the flyback voltage generated by reverse current in the power supply module, and the reverse current protection circuit further configured for deactivating the synchronous rectifier including the control circuit and the one or more switches, in response to detecting the flyback voltage, until the reverse current no longer attempts to flow through said at least one power supply module.

15. The power supply of claim 14 wherein the flyback voltage is a non-zero flyback voltage.

16. The power supply of claim 14 wherein the output choke includes a main winding and an auxiliary winding, and wherein the reverse current protection circuit is configured for detecting the flyback voltage across the main winding as reflected through the auxiliary winding.

17. The power supply of claim 14 wherein the reverse current protection circuit includes one or more latch elements for holding the synchronous rectifier in the deactivated state.

18. The power supply of claim 17 wherein the reverse current protection circuit includes a reset circuit for activating the synchronous rectifier in response to detecting a turn-on condition.

19. The power supply of claim 18 wherein the reset circuit includes a timer defined by a time constant for delaying the reset circuit from activating the synchronous rectifier in response to detecting the turn-on condition.

20. The power supply of claim 14 wherein the power supply includes a plurality of interconnected power supply modules for supplying power to an output load, and wherein the plurality of interconnected power supply modules includes said at least one power supply module.

21. The power supply of claim 20 wherein the plurality of interconnected power supply modules each include a synchronous rectifier and a reverse current protection circuit, wherein each synchronous rectifier includes one or more switches and a control circuit for the one or more switches, and wherein each reverse current protection circuit is configured for detecting a flyback voltage generated by reverse current in its respective power supply module, and for deactivating its associated synchronous rectifier, including the control circuit and the one or more switches, in response to detecting the flyback voltage, until the reverse current no longer attempts to flow through said respective power supply module.

22. A power supply comprising:
   at least one power supply module including, an output choke, an ORing MOSFET and a reverse current protection circuit, the reverse current protection circuit configured for detecting a flyback voltage across the output choke, the flyback voltage being indicative of reverse current in the power supply module, and for deactivating the ORing MOSFET in response to detecting the flyback voltage.

23. The power supply of claim 22 wherein the flyback voltage is a non-zero flyback voltage.

* * * * *